July 13, 1943.  C. DODEGGE  2,324,372
MOTION PICTURE PROJECTOR APPARATUS
Filed May 3, 1941  3 Sheets-Sheet 3

Inventor:
Carl Dodegge
By Wallace and Cannon
His Attorneys

Patented July 13, 1943

2,324,372

UNITED STATES PATENT OFFICE 2,324,372

MOTION PICTURE PROJECTOR APPARATUS

Carl Dodegge, Maywood, Ill., assignor to Fred J. Wenzel, Chicago, Ill.

Application May 3, 1941, Serial No. 391,765

18 Claims. (Cl. 88—17)

This invention relates to motion picture projectors and, more specifically, to a new and improved operating and control mechanism for the film trap door of a motion picture projector.

An object of the present invention is to effect and realize a new and improved and simplified mechanism for opening and closing the film trap door of a motion picture projector.

A further object of the present invention is to effect and realize a new and improved and simplified mechanism for simultaneously operating the film trap door and fire shutter of a rear shutter motion picture projector.

A further object of the invention is to construct and arrange the new film trap door operating and control mechanism in such a manner that during repositioning of the film trap door from open to closed position the fire shutter is automatically and simultaneously closed.

Another object of the invention is to construct and arrange the new film trap door operating and control mechanism in such a manner that when the film trap door has been moved into closed position it will be securely held in closed position until the operating plunger of the new control mechanism is again manipulated.

An additional object of the invention is to improve upon, and to simplify, the prior art film trap door or gate operating mechanism as represented, for example, by the film trap door or gate operating mechanism which is disclosed in the Dina Patent No. 1,884,606.

Other and further objects of the present invention will be apparent from the following description and claims, and are illustrated in the accompanying drawings which, by way of illustration, show a preferred embodiment of the present invention and principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figure 1:
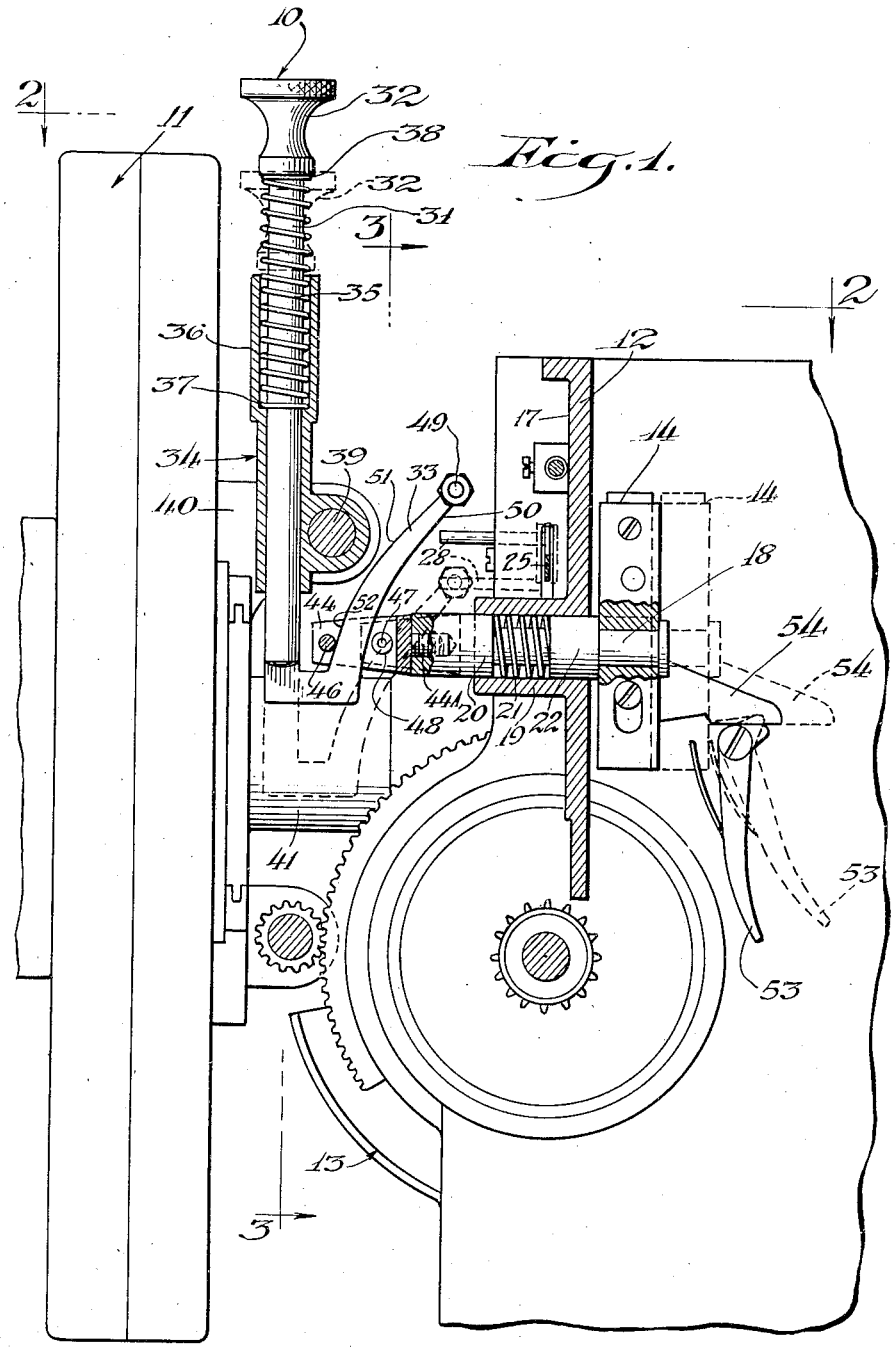
Fig. 1 is a fragmentary side elevational view, partly in section, of a motion picture projector embodying the present invention.

The present invention is shown in the drawings as being associated with and embodied in a motion picture projector of the general character which is shown, for example, in the Dina Patents Nos. 1,884,606 and 1,746,386, and of a type which is well known in the art.

Such motion picture projectors are of the so-called rear shutter type and embody what is known as a vertically extending supporting frame or head 12, which is arranged forwardly of a rear shutter housing 11 in which a rear shutter device, (not shown) for controlling the passage of light from a light source (not shown) to and through the film, is arranged. A slide rod 18 is slidably mounted in the head 12 and has an inner end portion which carries a film trap door 14 which presses the film between the head 12 and the film trap door 14 and prevents the film from vibrating or moving laterally as it passes between the head 12 and the film trap door 14 during operation of the projector.

In the use of a motion picture projector of the type with which the present invention is intended for use, the film is threaded between, and advanced downwardly between, the head 12 and the film trap door 14, and it is necessary, in order to thread and to unthread the film to open the film trap door 14 which is shown in closed position in full lines in Fig. 1 and in open position in dotted lines in the same figure.

The present invention is primarily concerned with a new and simplified device for manipulating or manually moving the slide rod 18 and the film trap door 14 carried thereby from its normal or closed position, as in full lines, Fig. 1, into open position, as in dotted lines, Fig. 1, and for holding the film trap door securely in closed position, that is, against unintentional displacement from closed position, and the construction of the new operating and control device for the slide rod 18 and film trap door 14 will now be described.

*Film trap door operating and control mechanism*

The new film trap door operating and control mechanism is generally indicated at 10 in the drawings and is shown mounted in front of the rear shutter housing 11 and rearwardly of the head 12, that is, between the head 12 and the rear shutter housing 11.

In a motion picture projector of the type with which the new film trap door operating and control device is intended for use, the film trap door 14 is secured to or mounted upon the outer end portion of a slide rod 18 which is slidably mounted in a hub or bearing 19 which is provided in the head 12. A collar 20 is provided on the inner end portion of the slide rod 18, and a compression spring 21 is positioned around the slide rod 18 in such a manner that it presses against the inner face of the collar 20 and against a stationary collar 22 which is positioned within the hub 19 and this spring 21 urges the film trap door 14 toward its normal or closed position against the head 12.

The new film trap door operating and control mechanism 10 comprises a vertically extending plunger 31 which is slidably mounted within a barrel 34, which is mounted in a manner which will be described presently, and this plunger 31 has a removable handle or knob 32 screwed onto the upper end portion thereof and an arcuate-shaped arm or cam 33 formed on the lower end portion thereof. A compression spring 35 encircles the plunger 31 and extends into an enlarged portion 36 of the barrel 34. The compression spring 35 presses against the bottom portion 37 of the enlarged portion 36 of the barrel 34, and against a shoulder 38 on the handle or knob 32, thereby tending to maintain the plunger 31 in raised position and in which position the lower end portion of the knob 32 is spaced from the upper end portion of the barrel 34.

A horizontally extending supporting rod 39 is secured to and extends substantially perpendicularly relative to the barrel 34 of the new operating and control mechanism 10, and when the new operating and control mechanism 10 is mounted in position of use on the motion picture projector 13, the supporting rod 39 is inserted through holes which are formed in a yoke 40 which is formed as an integral part of a supporting bracket 41 for the rear shutter housing 11, and the barrel 34 and the plunger 31 extend vertically upwardly along the shutter housing 11 but are sufficiently spaced therefrom to enable the operator to manipulate the plunger 31, by pressing downwardly on the handle or knob 32, without danger of his hand touching the rear shutter housing 11 or other adjacent parts of the projector and which, as is well known in the art, become hot in use.

The outer end portion 42 of the supporting rod 39 is threaded for the reception of a nut 43 which is screwed thereon so as to hold the supporting rod 39 in position of use in the yoke 40.

A bifurcated arm 44 is attached to the collar 20 on the slide rod 18 by means of a screw 44A. The bifurcated arm 44 provides a slot 45 and pins 46 and 47 extend perpendicularly through the slot 45. A cam roller 48 is provided on the pin 47, within the slot 45 to reduce wear on the arcuate-shaped arm or cam 33 during operation of the control mechanism 10, as will be explained presently.

When the new film trap door operating and control mechanism 10 is properly positioned in the projector 13, the arcuate-shaped arm or cam 33 extends through the slot 45 which is provided in and by the bifurcated arm 44, and is disposed between the pin 46 and the cam roller 48, and bears against the said cam roller 48.

As best shown in Fig. 1, the front face 50 of the arm or cam 33 is substantially arcuate-shaped or concave throughout its entire length or extent but the configuration of the rear face 51 of the arm or cam 33 varies from an arcuate or convex shape, in its upper portion, to an inclined flat face 52 in the bottom portion thereof, and this inclined flat face 52 provides a latching device for latching the film trap door 14 in closed position and against undesired or unintentional displacement therefrom.

Figure 2:
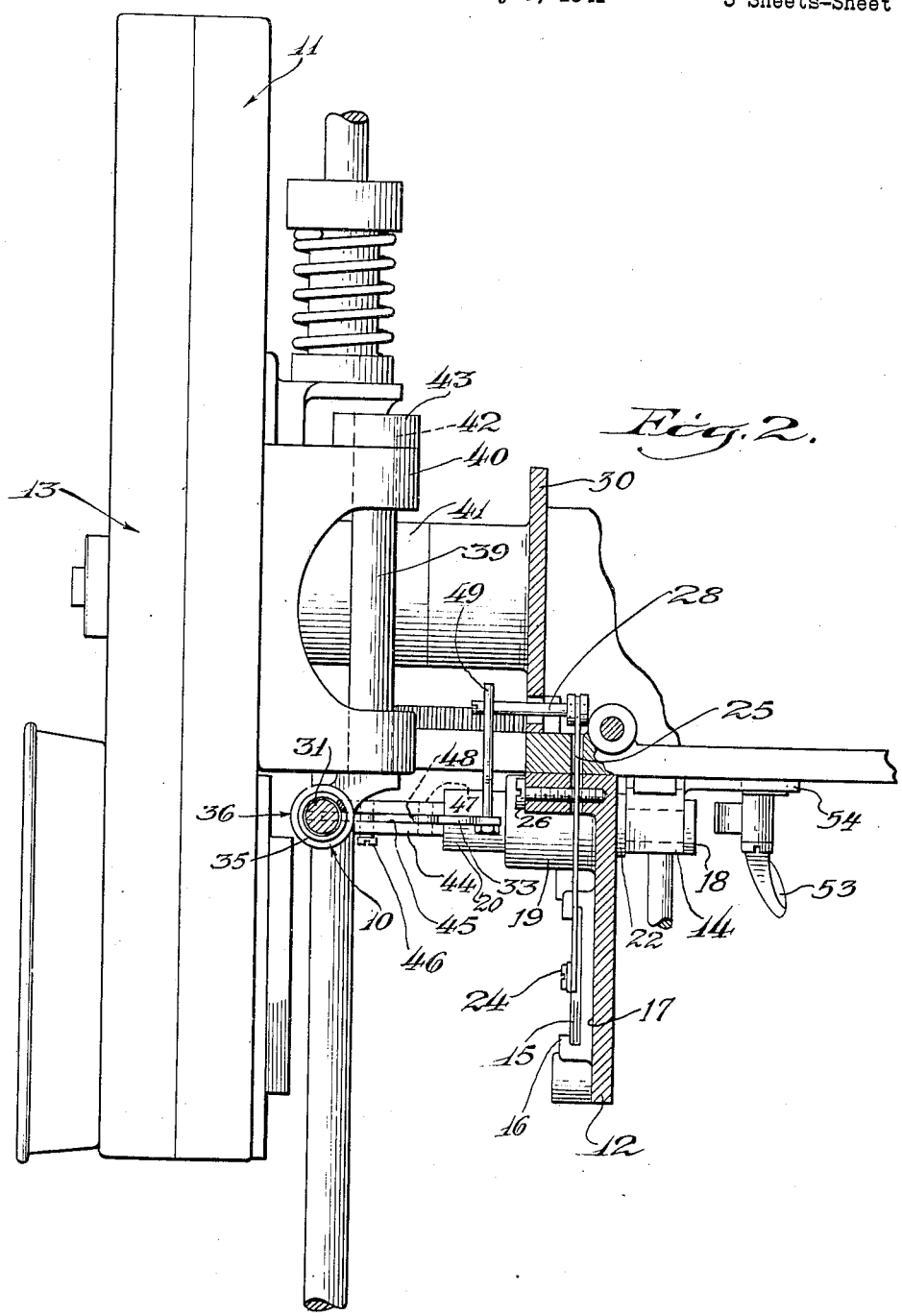
Fig. 2 is a top plan view on line 2—2 in Fig. 1, partly in section.
Figure 3:
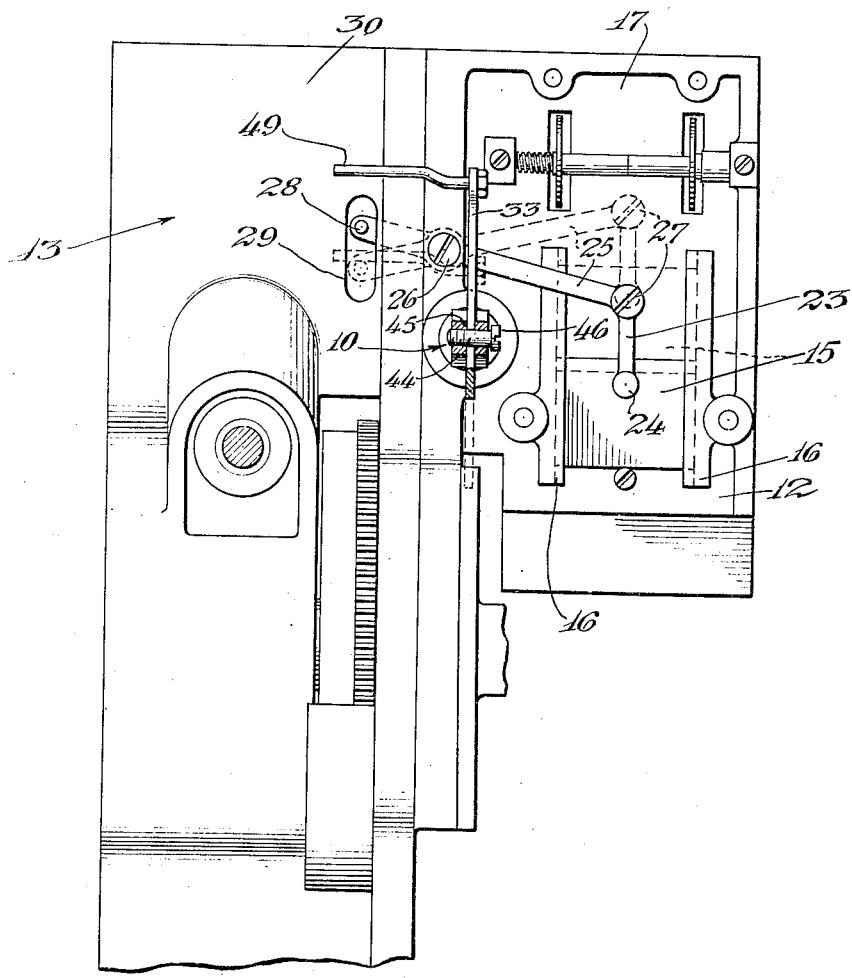
Fig. 3 is a sectional view on line 3—3 in Fig. 1.

When the projector 13 is in its normal or idle position, as, for example, when it has been stopped after showing a reel of film, the various parts of the projector 13 and the film trap door operating and control mechanism 10 are disposed in substantially the positions in which they are illustrated in solid lines in Figs. 1, 2 and 3; that is, the film trap door 14 is disposed against, or substantially against, the head 12; the arcuate-shaped arm or cam 33 and the plunger 31 and the handle or knob 32 are in their raised position; and the pin 46 engages against the inclined flat face 52 of the arcuate-shaped arm or cam 33.

In order to thread a new reel of film into the machine it is necessary to open the film trap door 14 so that the film may be positioned between the film trap door 14 and the head 12. When the film trap door 14 is opened, a conventional latch 53, which is of a type well known in the art and which is pivoted to the frame of the projector 13, engages a latch member 54, which is carried by the film trap door 14, and holds the film trap door 14 in open position, as is well understood in the art; it being further understood, in this connection, that the latching device 53—54 for latching the film trap door 14 in open position is old in the art and forms no part of the present invention.

*Fire shutter operating and control mechanism*

Referring to Fig. 3 it will be noted that a fire shutter 15 is vertically slidable in guides 16 which are mounted on the rear face 17 of the head 12 of the projector 13, in a manner which is well understood in the art. The fire shutter 15 is shown in full lines in Fig. 3 in its lowered or closed position and this is the position which it automatically assumes upon stopping of the film in the projector 13. The fire shutter 15 is shown in dotted lines in its raised position in Fig. 3 and this is the position which it assumes in its open position during normal operation of the projector and when the film is being threaded into the projector.

Insofar as it relates to the fire shutter 15 the present invention is concerned only with the movement of the fire shutter 15 into open or closed position (as in dotted lines, Fig. 3) when the film is being threaded into the projector, between the head 12 and the film trap door 14.

When a motion picture projector of the character with which the present invention is intended for use is in operation, the fire shutter 15 is disposed in raised or open position (as in dotted lines, Fig. 3) and light from the projection lamp or lamps embodied in the projector is directed through a light aperture formed in the head 12 and then through the film and onto the screen, as is well understood in the art, and in projectors of the type with which the present invention is intended for use the fire shutter is so arranged that when the projector is stopped, or if the film jambs so that it does not move past the light aperture formed in the head 12, the fire shutter automatically drops into closed position behind the light aperture and thereby shields the film, which is disposed in front of the light aperture, from the heat incidental to the light from the projection lamp or lamps.

However, when a film is being threaded into the projector the projection lamp is turned off and there is no need for keeping the fire shutter in closed position, and hence the fire shutter is raised during the threading operation so that the operator may sight through the aperture and thus properly frame the film relative to the light aperture in the projector.

As shown in Fig. 3, a connecting link 23 is pivotally attached, as at 24, to the fire shutter 15. A lever 25 is pivotally mounted between its ends, as at 26, upon the supporting frame of the projector 13. One end portion of the lever 25 is pivotally connected, as at 27, to the upper end portion of the link 23. A small rod 28 is carried by one end portion of the lever 25 and this small rod 28 extends through a slot 29 which is formed in a portion 30 of the head or supporting frame 12 of the projector 13.

A horizontally extending arm or rod 49 is secured to the outer end portion of the arcuate-shaped arm or cam 33 and, when the new operating and control mechanism 10 is positioned in the projector 13, the rod 49 overlies and extends substantially at right angles to that portion of the small rod 28 which extends rearwardly from the slot 29 in the portion 30 of the head 12.

*Operation*

To open the film trap door 14 and the fire shutter 15, the operator presses downwardly on the push-knob 32, thus moving the plunger 31 and the arcuate-shaped arm or cam 33 downwardly against the action of the compression spring 35. During the downward movement of the plunger 33 and its arcuate-shaped arm or cam 33, the concave front face 50 of the cam member 33 engages the cam roller 48 in the slot 45 and pushes the slide rod 18 and the film trap door 14 carried thereby forwardly, against the action of the compression spring 21, until the latch member 53 engages the latch member 54 and thereby holds or latches the film trap door 14 in open position.

When the film trap door 14 has thus been latched in open position by the latching device 53—54, and the push-knob 32 and plunger 31 are released by the operator, the convex rear face 51 of the arcuate-shaped arm or cam 33 engages the pin 46 which extends across the slot 45 and the plunger 31 and its arcuate-shaped arm or cam 33 are thus latched in depressed or lowered position, against the action of the compression spring 35 which, at this time, is compressed and hence tends to raise the plunger 31 and the cam 33 carried thereby.

In order to close the film trap door 14, after the film has been threaded into the projector, the latch trigger 53 is pressed inwardly so as to unlatch it from engagement with the latch member 54, thereby releasing the slide rod 18 and the film trap door 14 for return to their normal or closed position whereupon the spring 21 acts on the slide rod 18 to move the slide rod 18 and the film trap door 14 carried thereby into closed position, and the compression spring 35 acts directly on the plunger 31 to raise or lift the plunger 31 and its cam 33.

As the cam 33 is thus raised, the pin 46 rides against the convexly curved rear face 51 of the cam 33 and, in so doing, aids the compression spring 21 in returning the slide rod 18 and film trap door 14 carried thereby to their normal or closed position against the head 12.

When the film trap door 14 has been returned to its normal or closed position, against the head 12, as described above, the pin 44 in the slot 45 engages the inclined flat face 52 which is formed on the lower end portion of the arm or cam 33 and the frictional engagement between the pin 46 and the inclined but flat face 52 of the cam 33 is sufficient to, and does, securely latch the slide rod 18 and the film trap door 14 in closed position and against undesired or unintentional opening of the film trap door 14.

As and when the plunger 31 is depressed to move the slide rod 18 and the film trap door 14 carried thereby into open position, from right to left or from full to dotted line position, Fig. 1, the downward movement of the cam 33 causes the small rod or pin 49, which is carried thereby, to engage the small rod or pin 28 and press it downwardly, thus pivoting the fire shutter operating lever 25, at 26 (counterclockwise, from full to dotted line position, Fig. 3), thereby raising the link 23 and opening the fire shutter 15, and, as previously described, when the fire shutter 15 is thus raised into open position the operator may readily frame the film relative to the light aperture.

During the closing movement of the slide rod 18 and the film trap door 14, and the incidental upward movement of the plunger 31 and the cam 33 carried thereby, the small rod or pin 49, which is carried by the cam 33, moves out of engagement with the small rod or pin 28 which is carried by the fire shutter operating lever 25, thereby allowing the fire shutter 15 to fall by gravity into its closed position, in which it is shown in full lines in Fig. 3.

It will be seen from the foregoing description, taken in conjunction with the accompanying drawings, that the present invention provides a new and improved relatively simple and inexpensive but efficient operating and control device for the slidable supporting rod for the film trap door of a motion picture projector of the rear shutter type; and for the film trap door carried by the said slidable supporting member, and, in conjunction therewith, a novel and simple operating and control device for the fire shutter of said motion picture projector; and that the present invention thus accomplishes its intended objects including those which have been set forth hereinbefore.

While I have illustrated and described a preferred form of my invention, it is to be understood that this is capable of variation and modification and I, therefore, do not wish to be limited to the precise details set forth but desire to avail myself of such changes and alterations as fall within the scope of the following claims.

I claim:

1. In a motion picture projector, in combination, a head, a supporting member slidably mounted in the said head and adapted to carry a film trap door forwardly of the said head, and means for moving the said supporting member and the said film trap door carried thereby relative to the said head and into open position, said moving means including a manually operable member slidably mounted on the said projector, said manually operable member being manually slidable in a direction substantially perpendicular to the sliding movement of said supporting member to effect operation of said moving means and thereby move said film trap door into open position.

2. In a motion picture projector, in combination, a vertically extending head, a horizontally extending supporting member slidably mounted in the said head and having an inner end portion adapted to carry a film trap door forwardly of the said head, means urging the said supporting member and the said film trap door carried thereby into closed position relative to the said head and the said film trap door substantially against the said head, and means for moving the said supporting member and the said film trap door carried thereby relative to the said head, and against the action of the said urging means, into open position, said moving means including a vertically extending manually operable plunger slidably mounted on the said projector rearwardly of the said head, said plunger being adapted upon manual operation thereof to effect operation of said moving means so as to move said film trap door into open position.

3. The device defined in claim 2 in which said moving means includes movable members which when properly engaged are adapted to latch said film trap door in said closed position, and in which said device includes means normally urging the said plunger outwardly into raised position, and said movable members into said proper engagement to latch said film trap door in said closed position.

4. The device defined in claim 2 in which the said means for moving the said supporting member and the said film trap door carried thereby into open position includes a pair of operable members one of which is carried by the said plunger and the other of which is carried by the said supporting member.

5. The device defined in claim 2 in which the said means for moving the said supporting member and the said film trap door carried thereby into open position includes a cam member carried by the said supporting member rearwardly of the said head and a cooperating cam member carried by the said plunger.

6. The device defined in claim 2 in which the said means for moving the said supporting member and the said film trap door carried thereby into open position includes a cam roller carried by the said supporting member rearwardly of the said head and a cam member carried by the lower end portion of the said plunger and operatively engageable with the said cam roller.

7. A motion picture projector as defined in claim 2 which is of the rear shutter type and which includes a rear shutter housing disposed rearwardly of the said head, and in which the said plunger is slidably carried by the said rear shutter housing.

8. In a motion picture projector of the rear shutter type and which includes a head, a rear shutter housing disposed rearwardly of the said head, a fire shutter slidably carried by the said head for substantially vertical movement relative to the said head into open or raised position and into closed or lowered position, a manually operable plunger slidably carried by the said rear shutter housing for substantially vertical movement thereon, a spring normally urging the said manually operable plunger into raised position, and means under the control of the said plunger and coacting therewith, when the said plunger is depressed, for moving the said fire shutter into raised and open position.

9. A motion picture projector as defined in claim 2 which includes a fire shutter slidably carried by the said head for vertical movement thereon and which projector includes means under the control of, and operated by, the said plunger, for moving the said fire shutter into raised and open position as and when the said plunger is depressed to move the said supporting member and the said film trap door carried thereby into open position.

10. A motion picture projector as defined in claim 2 which includes a fire shutter slidably carried by the said head for vertical movement thereon and in which the said means for moving the said supporting member and the said film trap door carried thereby into open position includes an upwardly extending arm carried by the lower end portion of the said plunger and operatively engageable with the said supporting member and which projector includes means under the control of and coacting with the said upwardly extending arm for moving the said fire shutter into raised and open position as and when the said plunger is depressed to move the said supporting member and the said film trap door carried thereby into open position.

11. In a motion picture projector of the type which includes a vertically extending head, a shutter disposed rearwardly of the said head, a slide rod slidably mounted in the said head for substantially horizontal movement therein, and a film trap door carried by the said slide rod forwardly of the said head, an operating and control device for the said slide rod and the said film trap door carried thereby, said operating and control device comprising a manually operable plunger adapted to be slidably mounted in the said projector, rearwardly of the said head, for substantially vertical movement, a spring normally urging the said manually operable plunger into raised position, and means under the control of the said manually operable plunger, and adapted to coact therewith when the said plunger is depressed, to move the said slide rod and the said film trap door carried thereby into open position.

12. In a motion picture projector of the type which includes a vertically extending head, a shutter disposed rearwardly of the said head, a slide rod slidably mounted in the said head for substantially horizontal movement therein, and a film trap door carried by the said slide rod forwardly of the said head, an operating and control device for the said slide rod and the said film trap door carried thereby, said operating and control device comprising a manually operable plunger adapted to be slidably mounted in the said projector, rearwardly of the said head, for substantially vertical movement, a spring normally urging the said manually operable plunger into raised position, and means under the control of the said manually operable plunger, and adapted to coact therewith when the said plunger is depressed, to move the said slide rod and the said film trap door carried thereby into open position, said means including a cam member carried by the lower end portion of the said plunger and a cam element adapted to be mounted on the said slide rod, rearwardly of the said head, and to be engaged by the said cam member, when the said manually operable plunger is depressed, for moving the said slide rod, and the said film trap door carried thereby, into open position.

13. In a motion picture projector of the type which includes a vertically extending head, a shutter disposed rearwardly of the said head, a slide rod slidably mounted in the said head for substantially horizontal movement therein, and a film trap door carried by the said slide rod forwardly of the said head, an operating and control device for the said slide rod and the said film trap door carried thereby, said operating and control device comprising a manually operable plunger adapted to be slidably mounted in the said projector, rearwardly of the said head, for substantially vertical movement, a spring normally urging the said manually operable plunger into raised position, and means under the control of the said manually operable plunger, and adapted to coact therewith when the said plunger is depressed, to move the said slide rod and the said film trap door carried thereby into open position, said means including a cam roller adapted to be mounted upon the said slide rod, rearwardly of the said head, and an upwardly extending arm carried by the lower end portion of the said manually operable plunger and having a concave front cam face adapted to engage with the said cam roller to move the said slide rod and the said film trap door carried thereby into open position when the said manually operable plunger is depressed, against the action of the said spring.

14. In a motion picture projector, in combination, a vertically extending head, a horizontally extending supporting member slidably mounted in the said head and having an inner end portion adapted to carry a film trap door forwardly of the said head, means urging the said supporting member and the said film trap door carried thereby into closed position relative to the said head and the said film trap door substantially against the said head, and means for moving the said supporting member and the said film trap door carried thereby relative to the said head, and against the action of the said urging means, into open position, said moving means including: a vertically extending manually operable plunger slidably mounted in the said projector rearwardly of the said head, a cam roller carried by the said supporting member rearwardly of the said head, and an upwardly extending arm carried by the lower end portion of the said plunger and having a concave front cam face operatively engageable with the said cam roller when the said plunger is depressed.

15. In a motion picture projector, in combination, a vertically extending head, a horizontally extending supporting member slidably mounted in the said head and having an inner end portion adapted to carry a film trap door forwardly of the said head, means urging the said supporting member and the said film trap door carried thereby into closed position relative to the said head and the said film trap door substantially against the said head, and means for moving the said supporting member and the said film trap door carried thereby relative to the said head, and against the action of the said urging means, into open position, said moving means including: a vertically extending manually operable plunger slidably mounted in the said projector rearwardly of the said head, a cam roller carried by the said supporting member rearwardly of the said head, and an upwardly extending arm carried by the lower end portion of the said plunger and having a concave front cam face operatively engageable with the said cam roller when the said plunger is depressed, said upwardly extending arm having a convex rear face engageable with a horizontally extending latch member carried by the outer or rear end portion of the said supporting member.

16. In a motion picture projector, in combination, a vertically extending head, a horizontally extending supporting member slidably mounted in the said head and having an inner end portion adapted to carry a film trap door forwardly of the said head, means urging the said supporting member and the said film trap door carried thereby into closed position relative to the said head and the said film trap door substantially against the said head, and means for moving the said supporting member and the said film trap door carried thereby relative to the said head, and against the action of the said urging means, into open position, said moving means including: a vertically extending manually operable plunger slidably mounted on the said projector rearwardly of the said head, a cam roller carried by the said supporting member rearwardly of the said head, and an upwardly extending arm carried by the lower end portion of the said plunger and having a concave front cam face operatively engageable with the said cam roller when the said plunger is depressed, said upwardly extending arm having a convex rear face engageable with a horizontally extending latch member carried by the outer or rear end portion of the said supporting member and said upwardly extending arm having a substantially straight flat surface formed thereon as a continuation of the said convex rear face thereof and below the latter, said substantially straight flat surface of the said upwardly extending arm being latchingly engageable with the said horizontally extending latch member for holding the said supporting member and the said film trap door carried thereby in closed position.

17. In a motion picture projector, in combination, a vertically extending head, a horizontally extending supporting member slidably mounted in the said head and having an inner end portion adapted to carry a film trap door forwardly of the said head and having an open and a closed position, a fire shutter slidably carried by the said head and having an open and a closed position, an operating element attached to said supporting member, a second operating element attached to said film trap door, a manually operable plunger mounted on said projector and extending substantially perpendicularly relative to said supporting member and adapted to be slidably moved along its longitudinal axis, means carried by said plunger and operatively engageable with the said operating element on said supporting member and with the said operating element on said fire shutter to move the said film trap door and the said fire shutter into open position upon manipulation of said plunger in one direction along its longitudinal axis, and means urging said supporting member and said film trap door carried thereby into closed position.

18. In a motion picture projector, in combination, a head, a supporting member slidably mounted on said head and adapted to carry a film trap door forwardly of said head, and means for moving the said supporting member and the said film trap door carried thereby relative to the said head and into open position, said moving means including a constantly vertically extending member and said constantly vertically extending member being manually operable in a substantially vertical direction to effect operation of said slidably mounted supporting member and the said film trap door carried thereby and said constantly vertically extending member being arranged at the opposite side of the said head from the said film trap door.

CARL DODEGGE.